(12) United States Patent
Matsumura et al.

(10) Patent No.: US 12,073,963 B2
(45) Date of Patent: Aug. 27, 2024

(54) CORE ELECTRIC WIRE FOR MULTICORE CABLE, AND MULTICORE CABLE

(71) Applicant: SUMITOMO ELECTRIC INDUSTRIES, LTD., Osaka (JP)

(72) Inventors: Yutaka Matsumura, Osaka (JP); Shigeyuki Tanaka, Osaka (JP); Taro Fujita, Osaka (JP); Takaya Kohori, Kanuma (JP); Takumi Ooshima, Kanuma (JP); Jo Yagisawa, Kanuma (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 220 days.

(21) Appl. No.: 17/615,129

(22) PCT Filed: Jun. 1, 2020

(86) PCT No.: PCT/JP2020/021671
§ 371 (c)(1),
(2) Date: Nov. 30, 2021

(87) PCT Pub. No.: WO2020/246442
PCT Pub. Date: Dec. 10, 2020

(65) Prior Publication Data
US 2022/0238253 A1 Jul. 28, 2022

(30) Foreign Application Priority Data
Jun. 3, 2019 (JP) .................................. 2019-103449

(51) Int. Cl.
*H01B 7/02* (2006.01)
*C09D 5/18* (2006.01)
(Continued)

(52) U.S. Cl.
CPC ............. *H01B 7/0009* (2013.01); *C09D 5/18* (2013.01); *C09D 123/06* (2013.01);
(Continued)

(58) Field of Classification Search
CPC . H01B 3/44; H01B 3/46; H01B 3/427; H01B 3/441; H01B 7/009; H01B 7/18;
(Continued)

(56) References Cited

U.S. PATENT DOCUMENTS

| 7,332,677 B2* | 2/2008 | Xu ........................ H01B 3/427 174/117 F |
| 2006/0131052 A1* | 6/2006 | Mhetar .................. H01B 3/427 174/110 R |

(Continued)

FOREIGN PATENT DOCUMENTS

| CN | 104981879 A | 10/2015 |
| EP | 2953139 A1 | 12/2015 |
| JP | 2017-025203 A | 2/2017 |
| JP | 2018-032515 A | 3/2018 |

*Primary Examiner* — William H. Mayo, III
(74) *Attorney, Agent, or Firm* — Oliff PLC

(57) ABSTRACT

A core electric wire for a multicore cable. The core electric wire includes a conductor composed of a plurality of elemental wires twisted together and an insulating layer coating a circumference of the conductor. The insulating layer includes a first component and a second component, the first component being high density polyethylene, the second component being at least one selected from the group consisting of a copolymer of ethylene and an α-olefin having a carbonyl group, and very-low density polyethylene. The first component has a content ratio of 10% by mass or more and 60% by mass or less to a total content of the polyethylene-based resin, and the second component has a content ratio of 20% by mass or more and 80% by mass or less to the total content of the polyethylene-based resin.

10 Claims, 4 Drawing Sheets

(51) Int. Cl.
*C09D 123/06* (2006.01)
*C09D 123/08* (2006.01)
*H01B 3/44* (2006.01)
*H01B 7/00* (2006.01)
*H01B 7/295* (2006.01)

(52) U.S. Cl.
CPC ....... *C09D 123/0869* (2013.01); *H01B 3/441* (2013.01); *H01B 7/295* (2013.01)

(58) Field of Classification Search
CPC .......... H01B 7/295; H01B 9/003; C09D 5/18; C09D 123/06; C09D 123/0869; C08K 3/26; C08K 5/09
USPC ... 174/110 R–110 SR, 113 R, 120 R–120 SR
See application file for complete search history.

(56) References Cited

U.S. PATENT DOCUMENTS

| | | | | |
|---|---|---|---|---|
| 2014/0326480 | A1* | 11/2014 | Hashimoto | H01B 7/295 |
| | | | | 174/113 R |
| 2015/0147571 | A1* | 5/2015 | Alexander | C08L 23/04 |
| | | | | 524/517 |
| 2015/0165987 | A1* | 6/2015 | Hayakawa | H01B 7/0045 |
| | | | | 174/72 A |
| 2017/0271048 | A1* | 9/2017 | Nishida | H01B 7/00 |
| 2017/0309370 | A1* | 10/2017 | Tanaka | H01B 3/441 |
| 2018/0061525 | A1* | 3/2018 | Kohori | H01B 3/447 |
| 2019/0172606 | A1* | 6/2019 | Kohori | H01B 7/1875 |

\* cited by examiner

CORE ELECTRIC WIRE FOR MULTICORE CABLE, AND MULTICORE CABLE

TECHNICAL FIELD

The present disclosure relates to a core electric wire for a multicore cable, and the multicore cable. The present application claims priority based on Japanese Patent Application No. 2019-103449, filed Jun. 3, 2019, the entire contents of which are incorporated herein by reference.

BACKGROUND ART

PTL 1 describes, as a core electric wire used for an in-vehicle multicore cable for electric parking brake (EPB) or the like, a core electric wire having a conductor and two insulating layers made of a resin and coating the conductor, with one insulating layer including a copolymer of ethylene and an α-olefin having a carbonyl group, and the other insulating layer including polyolefin or fluororesin.

CITATION LIST

Patent Literature

[PTL 1] Japanese Patent Laid-Open No. 2018-032515

SUMMARY OF INVENTION

The presently disclosed core electric wire for a multicore cable is
a core electric wire for a multicore cable that comprises a conductor composed of a plurality of elemental wires twisted together and an insulating layer coating a circumference of the conductor,
the insulating layer including a first component and a second component,
the first component being high density polyethylene,
the second component being at least one selected from the group consisting of
a copolymer of ethylene and an α-olefin having a carbonyl group, and very-low density polyethylene,
the first component having a content ratio of 10% by mass or more and 60% by mass or less to a total content of the polyethylene-based resin,
the second component having a content ratio of 20% by mass or more and 80% by mass or less to the total content of the polyethylene-based resin.

DETAILED DESCRIPTION

Figure 1:
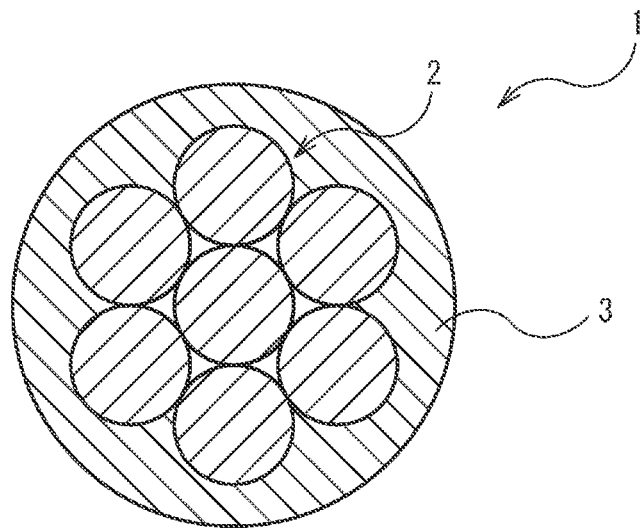
FIG. 1 is a schematic cross section of a core electric wire for a multicore cable according to a first embodiment of the present disclosure.

Problem to be Solved by the Present Disclosure

An in-vehicle multicore cable is used with at least some core electric wires thereof exposed from a sheath layer, and accordingly, the core electric wires are required to have high abrasion resistance. In addition, an in-vehicle multicore cable is complicatedly bent as it is routed in a vehicle, an actuator is driven and/or the like, and furthermore, the multicore cable is exposed to a low temperature of 0° C. or lower depending on the environment in which it is used, and accordingly, the multicore cable is required to have bending durability for low temperature.

The present disclosure has been provided under such circumstances, and contemplates a core electric wire for a multicore cable that is excellent in abrasion resistance, and bending durability for low temperature, and a multicore cable using the core electric wire.

Advantageous Effect of the Present Disclosure

A core electric wire for a multicore cable in one aspect of the present disclosure is excellent in abrasion resistance, and bending durability for low temperature.

DESCRIPTION OF EMBODIMENTS OF THE PRESENT DISCLOSURE

First, embodiments of the present disclosure will be specified and described.

In one aspect of the present disclosure, a core electric wire for a multicore cable is
a core electric wire for a multicore cable that comprises a conductor composed of a plurality of elemental wires twisted together and an insulating layer coating a circumference of the conductor,
the insulating layer including a first component and a second component,
the first component being high density polyethylene,
the second component being at least one selected from the group consisting of
a copolymer of ethylene and an α-olefin having a carbonyl group, and very-low density polyethylene,
the first component having a content ratio of 100% by mass or more and 60% by mass or less to a total content of the polyethylene-based resin,
the second component having a content ratio of 20% by mass or more and 80% by mass or less to the total content of the polyethylene-based resin.

The core electric wire for a multicore cable that comprises an insulating layer having a major component composed of a polyethylene-based resin including a first component and a second component having content ratios within the above-specified ranges, is excellent in abrasion resistance and is also excellent in bending durability for low temperature. In the present specification, "low temperature" means a range in temperature of −45° C. or higher and 0° C. or lower.

Herein, a "major component" refers to a constituent substance of the insulating layer that has a largest content ratio among all of the constituents of the insulating layer, and preferably has a content ratio of 50% by mass of more. "High-density polyethylene" refers to a polyethylene having a density of 0.935 $g/cm^3$ or more. "Very-low density polyethylene" refers to a polyethylene having a density of 0.855 $g/cm^3$ or more and less than 0.910 $g/cm^3$.

The copolymer of ethylene and the α-olefin having the carbonyl group is preferably an ethylene-acrylic acid alkyl ester copolymer. When the ethylene-acrylic acid alkyl ester copolymer is used, bending durability for low temperature can further be enhanced.

Preferably, the polyethylene-based resin further includes a third component, and the third component is at least one selected from the group consisting of linear low density polyethylene and low density polyethylene. When the polyethylene-based resin includes the third component, abrasion resistance, and bending durability for low temperature can further be enhanced.

Herein, "linear low density polyethylene" refers to a polyethylene having a density of 0.910 g/cm³ or more and less than 0.930 g/cm³, and obtained by copolymerizing ethylene and α-olefin. "Low density polyethylene" refers to a polyethylene having a density of 0.910 g/cm³ or more and less than 0.930 g/cm³, and obtained by polymerizing ethylene through high pressure polymerization.

Preferably, the third component has a content ratio of 5% by mass or more and 45% by mass or less to the total content of the polyethylene-based resin. When the third component has a content ratio in the above specified range, abrasion resistance, and bending durability for low temperature can further be enhanced.

Preferably, the insulating layer further includes a flame retardant. When the insulating layer includes a flame retardant, the core electric wire for a multicore cable can be enhanced in flame retardancy.

The conductor preferably has an average lateral cross-sectional area of 1.0 mm² or more and 3.0 mm² or less. When the conductor has an average lateral cross-sectional area in the above specified range, the core electric wire for a multicore cable can suitably be used for an in-vehicle multicore cable.

Preferably, the elemental wile has an average diameter of 40 μm or more and 100 μm or less, and the plurality of elemental wires are 196 to 2450 elemental wires. The elemental wire falling within the above specified ranges in average diameter and number can further effectively enhance abrasion resistance and bending durability.

Preferably, the conductor is a stranded wire composed of strands each composed of a plurality of elemental wires twisted together. The conductor that is a stranded wire composed of strands each composed of a plurality of elemental wires twisted together can further effectively enhance abrasion resistance and bending durability.

In another aspect of the present disclosure, a multicore cable is a multicore cable comprising a core wire composed of a plurality of core electric wires stranded together and a sheath layer surrounding the core wire, at least one of the plurality of core electric wires being a core electric wire for the multicore cable.

As the multicore cable has the above-described core electric wire for a multicore cable as a core electric wire configuring a core wire, the multicore cable is excellent in abrasion resistance and is also excellent in bending durability for low temperature.

The multicore cable comprising a core wire including core electric wires stranded together allows extensive application.

The multicore cable is suitably used as an in-vehicle cable.

DETAILED DESCRIPTION OF EMBODIMENTS OF THE PRESENT DISCLOSURE

Hereinafter a core electric wire for a multicore cable and the multicore cable according to embodiments of the present disclosure will be described in detail with reference to the drawings as necessary.

First Embodiment

FIG. 1 shows a core electric wire 1 provided for a multicore cable and comprising a conductor 2 formed of a plurality of elemental wires twisted together and an insulating layer 3 coating a circumference of conductor 2.

While core electric wire 1 for a multicore cable is not particularly limited in shape in lateral cross section, it for example has a round cross section. When core electric wire 1 for a multicore cable has a round lateral cross section, it can have an average outer diameter for example of 1 mm or more and 10 mm or less, although it varies depending on the application. While any method may be employed to measure an average outer diameter in the lateral cross section of the core electric wire for a multicore cable, the core electric wire for a multicore cable may be measured in outer diameter at any three points using a caliper and an average of such obtained outer diameters may be defined as an average outer diameter.

<Conductor>

Conductor 2 is formed by twisting a plurality of elemental wires at a fixed pitch. The elemental wire is not particularly limited, and examples thereof include a copper wire, a copper alloy wire, an aluminum wire, an aluminum alloy wire, and the like. Further, conductor 2 is preferably such that a plurality of elemental wires are twisted together to form a strand and a plurality of such strands are further stranded together to form a stranded wire to serve as conductor 2. The strands to be stranded together are preferably each formed of the same number of elemental wires twisted together.

The elemental wire preferably has an average diameter with a lower limit preferably of 40 μm, more preferably 50 μm, still more preferably 60 μm. The elemental wire preferably has the average diameter with an upper limit preferably of 100 μm, more preferably 90 μm. When the elemental wire has an average diameter smaller than the above specified lower limit or larger than the above specified upper limit, core electric wire 1 for a multicore cable may exhibit an insufficient bending durability enhancement effect. While any method may be employed to measure the elemental wire in average diameter, the method may for example be as follows: an average value obtained when the elemental wire is measured at any three points with a micrometer having cylindrical opposite ends to obtain an average diameter therefrom may serve as the average diameter of the elemental wire.

While the number of elemental wires is suitably designed in accordance with the application of the multicore cable, the diameter of the elemental wire, and the like, the lower limit therefor is preferably 196 wires, more preferably 294 wires. The upper limit for the number of elemental wires is preferably 2450 wires, more preferably 2000 wires. Examples of the stranded wire include: a stranded wire composed of 196 elemental wires forming 7 strands each formed of 28 elemental wires twisted together; a stranded wire composed of 294 elemental wires forming 7 strands each formed of 42 elemental wires twisted together; a stranded wire composed of 380 elemental wires forming 19 strands each formed of 20 elemental wires twisted together; a stranded wire composed of 1568 elemental wires forming seven strands each formed of 224 elemental wires forming seven strands each formed of 32 elemental wires twisted together; a stranded wire composed of 2450 elemental wires forming seven strands each formed of 350 elemental wires forming seven strands each formed of 50 elemental wires twisted together; and the like.

Conductor 2 has an average lateral cross-sectional area (including a gap between elemental wires) with a lower limit preferably of 1.0 mm², more preferably 1.5 mm, still more preferably 1.8 mm², still more preferably 2.0 mm². Conductor 2 has the average lateral cross-sectional area with an upper limit preferably of 3.0 mm², more preferably 2.8 mm². When conductor 2 has an average lateral cross-sectional area in the above specified range, core electric wire 1 for a multicore cable can suitably be used for an in-vehicle multicore cable. While any method may be used to calculate the conductor's average lateral cross-sectional area, it may be calculated for example as follows: For example, the conductor is measured in outer diameter at any three points with a caliper without squashing the conductor's stranded structure to thus obtain an average value of the three points and define it as an average outer diameter, and an area calculated from the average outer diameter may be defined as the conductor's average area.

<Insulating Layer>

Insulating layer 3 is formed of a composition containing a polyethylene-based resin as a major component, and is disposed in a layer on a circumference of conductor 2 to coat conductor 2. While insulating layer 3 is not particularly limited in average thickness, it is, for example, 0.1 mm or more and 5 nm of less. "Average thickness" as referred to herein means an average value in thickness as measured at any ten points. "Average thickness" referred to hereinafter for any other member or the like is also similarly defined.

The major component of insulating layer 3 is polyethylene-based resin. Examples of the polyethylene-based resin include high-density polyethylene (HDPE), a copolymer of ethylene and an α-olefin having a carbonyl group, very-low-density polyethylene (VLDPE), linear low-density polyethylene (LLDPE), and low-density polyethylene (LDPE).

(First Component)

The first component is high-density polyethylene. The first component has a content ratio with a lower limit of 10% by mass, preferably 15% by mass to the total content of the polyethylene-based resin. The first component has the content ratio with an upper limit of 60% by mass, preferably 50% by mass, more preferably 40% by mass, to the total content of the polyethylene-based resin. When the first component has a content ratio smaller than the above specified lower limit, it may result in insufficient abrasion resistance. When the first component has a content ratio larger than the above specified upper limit, it may result in insufficient bending durability for low temperature.

(Second Component)

The second component is at least one selected from the group consisting of a copolymer of ethylene and an α-olefin having a carbonyl group, and very-low density polyethylene. Examples of the copolymer of ethylene and the α-olefin having the carbonyl group include an ethylene-acrylic acid alkyl ester copolymer and an ethylene-vinyl acetate copolymer (EVA). Inter alia, the ethylene-acrylic acid alkyl ester copolymer is preferable as it is excellent in bending durability for low temperature. Examples of the ethylene-acrylic acid alkyl ester copolymer include an ethylene-ethyl acrylate copolymer (EEA), an ethylene-methyl acrylate copolymer (EMA), and an ethylene-butyl acrylate copolymer (EBA). The copolymer of ethylene and the α-olefin having the carbonyl group can be one or more of these copolymers.

The second component has a content ratio with a lower limit of 20% by mass, preferably 30% by mass, more preferably 40% by mass to the total content of the polyethylene-based resin. The second component has the content ratio with an upper limit of 80% by mass, preferably 70% by mass. When the second component has a content ratio smaller than the above specified lower limit, it may result in insufficient bending durability for low temperature. When the second component has a content ratio larger than the above specified upper limit, it may result in insufficient abrasion resistance.

The second component may be the copolymer of ethylene and the α-olefin having the carbonyl group or the very-low density polyethylene alone or may be a mixture of the two. When the copolymer of ethylene and the α-olefin having the carbonyl group and the very-low density polyethylene am mixed together and thus used, the mass ratio of the copolymer of ethylene and the α-olefin having the carbonyl group to the very-low density polyethylene (i.e., the copolymer of ethylene and the α-olefin having the carbonyl group/the very-low density polyethylene) is not particularly limited.

(Third Component)

Insulating layer 3 may further contain a third component. The third component is at least one selected from the group consisting of a linear low density polyethylene and a low density polyethylene. The third component has a content ratio with a lower limit of 5% by mass, preferably 10% by mass to the total content of the polyethylene-based resin. The third component has the content ratio with an upper limit of 45% by mass, preferably 40% by mass.

The third component may be the linear low-density polyethylene or the low-density polyethylene alone or may be a mixture of the two. When the linear low-density polyethylene and the low-density polyethylene are mixed together and thus used, the mass ratio of the linear low-density polyethylene to the low-density polyethylene (i.e., linear low-density polyethylene/low-density polyethylene) is not particularly limited.

Insulating layer 3 contains the polyethylene-based resin in an amount with a lower limit preferably of 50% by mass, more preferably 70% by mass. Insulating layer 3 contains the polyethylene-based resin in the amount with an upper limit preferably of 100% by mass, more preferably 90% by mass. When the contained amount is smaller than the above specified lower limit, it may result in insufficiency in abrasion resistance, and bending durability for low temperature.

Insulating layer 3 has a coefficient of linear expansion C with a lower limit preferably of $1.00 \times 10^{-5} K^{-1}$, more preferably $5.00 \times 10^{-5} K^{-1}$ for −35° C. to 25° C. insulating layer 3 has the coefficient of linear expansion C with an upper limit preferably of $1.00 \times 10^{-3} K^{-1}$, more preferably $5.00 \times 10^{-4} K^{-1}$ for −35° C. to 25° C. When insulating layer 3 has a coefficient of linear expansion C smaller than the above specified lower limit, insulating layer 3 may have an insufficient mechanical property such as insufficient strength. When insulating layer 3 has a coefficient of linear expansion C larger than the above specified upper limit, insulating layer 3 is resistant to deformation for low temperature, and core electric wire 1 for a multicore cable may be reduced in bending durability for low temperature. A "coefficient of linear expansion" as referred to herein is a value calculated from a dimensional change of a thin plate with respect to variation in temperature pursuant to a method for determining dynamic mechanical properties, as specified in JIS-K7244-4 (1999), using a dynamic viscoelasticity analyzer ("DVA-220" manufactured by IT keisoku seigyo K.K.) in a tensile mode in a range in temperature of −100° C. to 200° C. with a temperature increasing rate of 5° C./minute at a frequency of 10 Hz with a strain of 0.05%.

Insulating layer 3 has a modulus of elasticity $E_1$ with a lower limit preferably of 1000 MPa, more preferably 2000 MPa for −35° C. Insulating layer 3 has modulus of elasticity $E_1$ with an upper limit preferably of 4000 MPa, more preferably 3500 MPa. When insulating layer 3 has modulus of elasticity $E_1$ smaller than the above specified lower limit, insulating layer 3 may have an insufficient mechanical property such as insufficient strength. When insulating layer 3 has modulus of elasticity $E_1$ larger than the above specified upper limit, insulating layer 3 is resistant to deformation for low temperature, and core electric wire 1 for a multicore cable may be reduced in bending durability for low temperature. A "modulus of elasticity" as referred to herein is a value of a storage modulus measured pursuant to a method for determining dynamic mechanical properties, as specified in JIS-K7244-4 (1999), using a dynamic viscoelasticity analyzer ("DVA-220" manufactured by IT keisoku seigyo K.K.) in a tensile mode in a range in temperature of −100° C. to 200° C. with a temperature increasing rate of 5° C./minute at a frequency of 10 Hz with a strain of 0.05%.

Insulating layer 3 has a modulus of elasticity $E_2$ with a lower limit preferably of 200 MPa, more preferably 250 MPa for 25° C. Insulating layer 3 has modulus of elasticity $E_2$ with an upper limit preferably of 2000 MPa, more preferably 1750 MPa for 25° C. When insulating layer 3 has modulus of elasticity $E_2$ smaller than the above specified lower limit, it may result in poor abrasion resistance. When insulating layer 3 has modulus of elasticity $E_2$ larger than the above specified upper limit, the cable is increased in bending rigidity and the conductor may fail to have sufficient bendability.

Insulating layer 3 has a product of coefficient of linear expansion C for the range of −35° C. to 25° C. and modulus of elasticity $E_1$ for −35° C., i.e., $C \times E_1$, with a lower limit of 0.10 MPaK$^{-1}$, preferably 0.15 MPaK$^{-1}$. Insulating layer 3 has product $C \times E_1$ with an upper limit of 0.90 MPaK$^{-1}$, preferably 0.80 MPaK$^{-1}$, more preferably 0.70 MPaK$^{-1}$ When product $C \times E_1$ is smaller than the lower limit, insulating layer 3 may have an insufficient mechanical property such as insufficient strength. When product $C \times E_1$ is larger than the above specified upper limit, insulating layer 3 is resistant to deformation for low temperature, and core electric wire 1 for a multicore cable may be reduced in bending durability for low temperature. Note that product $C \times E_1$ can be adjusted by the type, content ratio, etc. of the polyethylene-based resin.

The polyethylene-based resin has a melting point with a lower limit preferably of 80° C., more preferably 85° C., still more preferably 90° C. The polyethylene-based resin has the melting point with an upper limit preferably of 130° C., more preferably 120° C., still more preferably 110° C. When the melting point is lower than the lower limit, the melting point is lower than the temperature of the environment in which the core electric wire is used, and sufficient abrasion resistance, strength and other mechanical properties may not be obtained for a range in temperature of room temperature or higher. When the melting point exceeds the upper limit, the core electric wire is prone to fatigue fracture and may crack and be unable to present sufficient bendability. In the core electric wire for a multicore cable, the polyethylene-based resin is a mixture of at least two types, that is, the above specified first and second components, and accordingly, the mixture with a melting point within the above specified melting-point range suffices. For example, when two types of polyethylene-based resins are mixed together, with one polyethylene-based resin having a melting point within the above specified melting-point range and the other having a melting point exceeding 130° C., the mixture with a melting point within the above specified melting-point range suffices. In that case, when one polyethylene-based resin within the above melting point range is a major component (50% by mass or more) of the entire polyethylene-based resin, the mixture can be deemed to have a melting point within the above melting point range.

Insulating layer 3 may contain additives such as a flame retardant, a flame retardant aid, an antioxidant, a lubricant, a colorant, a reflection imparting agent, a concealer, a processing stabilizer, and a plasticizer, if necessary. Insulating layer 3 may contain another resin other than the polyethylene-based resin. Examples of the other resin include a styrene-ethylene/butylene-styrene block copolymer (SEBS) and an ethylene-tetrafluoroethylene copolymer (ETFE).

The other resin is contained in an amount with an upper limit preferably of 50% by mass, more preferably 30% by mass, still more preferably 10% by mass. Insulating layer 3 may not substantially contain any other resin.

Examples of the flame retardant include halogen-based flame retardants such as a bromine-based flame retardant and a chlorine-based flame retardant, and non-halogen-based flame retardants such as metal hydroxide, a nitrogen-based flame retardant and a phosphorus-based flame retardant. The flame retardant may be of one type alone or two or more types in combination.

Examples of the bromine-based flame retardant include decabromodiphenylethane. Examples of the chlorine-based flame retardant include chlorinated paraffin, chlorinated polyethylene, chlorinated polyphenol, and perchloropentacyclodecane. Examples of the metal hydroxide include magnesium hydroxide and aluminum hydroxide. Examples of the nitrogen-based flame retardant include melamine cyanurate, triazine, isocyanurate, urea, and guanidine. Examples of the phosphorus-based flame retardant include a phosphinic acid metal salt, phosphaphenanthrene, melamine phosphate, ammonium phosphate, phosphate ester, and polyphosphazene.

Insulating layer 3 contains the flame retardant in an amount with a lower limit preferably of 10 parts by mass, more preferably 50 parts by mass, relative to 100 parts by mass of the resin component. Insulating layer 3 contains the flame retardant in the amount with an upper limit preferably of 200 parts by mass, more preferably 130 parts by mass. When the flame retardant's content is smaller than the lower limit, the flame retardant may be insufficiently flame-retardant. When the flame retardant's content exceeds the upper limit, it may impair insulating layer 3 in extrusion-moldability, and mechanical properties such as elongation and tensile strength.

Insulating layer 3 preferably has a resin component crosslinked. Insulating layer 3 preferably has a resin component crosslinked in methods, which include exposing to ionizing radiation, using a thermal crosslinking agent such as organic peroxide, and a adding a silane coupling agent to cause a silane grafting reaction, for example.

<Method for Manufacturing Core Electric Wire for Multicore Cable>

Core electric wire 1 for a multicore cable can be obtained in a manufacturing method mainly comprising the steps of: twisting a plurality of elemental wires together (a twisting step); and forming insulating layer 3 to coat a circumference of conductor 2 composed of the plurality of elemental wires twisted together (an insulating layer forming step).

As a method for coating the circumference of conductor 2 with insulating layer 3, for example, a method for extruding a composition to the circumference of conductor 2 for forming insulating layer 3 is referred to.

It is recommendable that the method for manufacturing core electric wire 1 for a multicore cable further comprise the step of crosslinking a resin component of insulating layer 3 (a crosslinking step). The crosslinking step may be performed before coating conductor 2 with the composition forming insulating layer 3, or may be performed thereafter (i.e., after insulating layer 3 is formed).

The crosslinking can be carried out by exposing the composition to ionizing radiation. Examples of ionizing radiation include a γ-ray, an electron beam, an X-ray, a neutron beam, and a high-energy ion beam. Exposure to ionizing radiation is performed at a dose with a lower limit preferably of 10 kGy, more preferably 30 kGy.

Exposure to ionizing radiation is performed at the dose with an upper limit preferably of 300 kGy, more preferably 240 kGy. When the dose is smaller than the lower limit, the crosslinking reaction may insufficiently proceed. When the dose is larger than the upper limit, the resin component may be decomposed.

Second Embodiment

Figure 2:
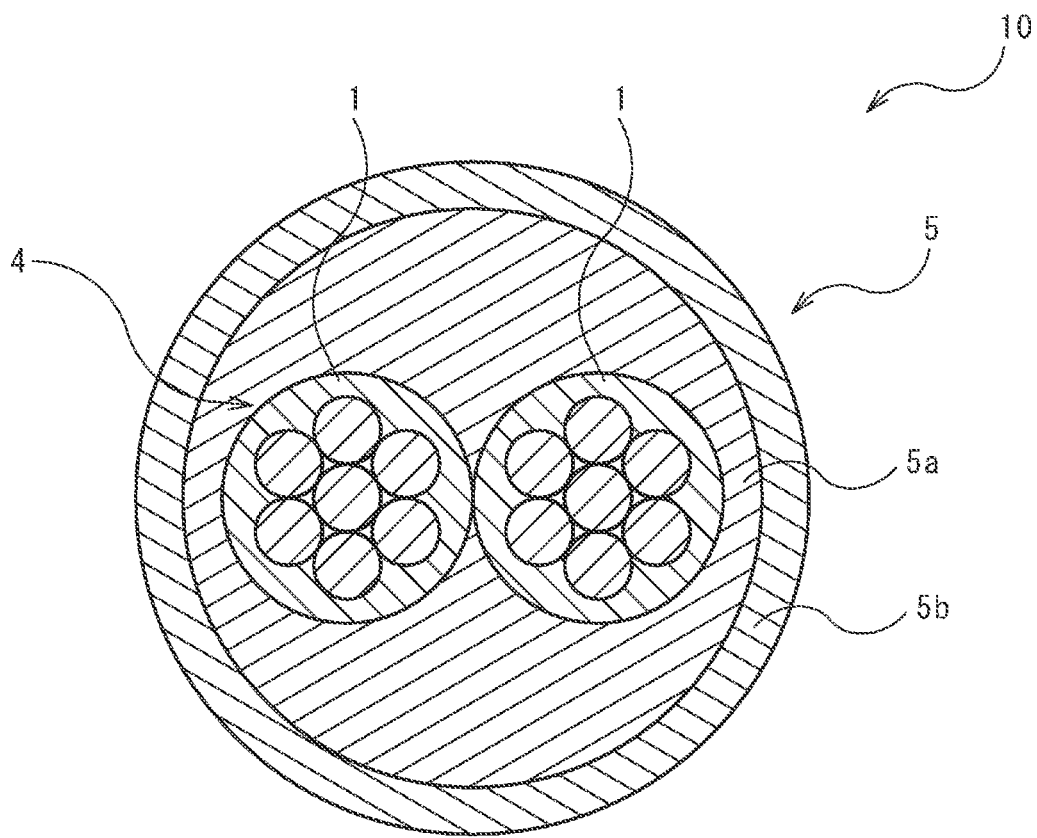
FIG. 2 is a schematic cross section of a multicore cable according to a second embodiment of the present disclosure.

FIG. 2 shows a multicore cable 10 comprising a core wire 4 composed of a plurality of core electric wires 1, each as shown in FIG. 1, stranded together for the multicore cable, and a sheath layer 5 disposed to surround core wire 4. Sheath layer 5 has an inner (or intermediate) sheath layer 5a and an outer sheath (or outer covering) layer 5b. Multicore cable 10 can suitably be used as an in-vehicle multicore cable. Specific applications include, for example, an electric parking brake (EPB) and an in-wheel motor.

Multicore cable 10 has an outer diameter designed, as appropriate, depending on the application, with a lower limit preferably of 6 mm, more preferably 8 mm. Multicore cable 10 has the outer diameter with an upper limit preferably of 16 mm, more preferably 14 mm, still more preferably 12 mm, particularly preferably 10 mm.

<Core Wire>

Core wire 4 is composed of a twisted pair of two core electric wires 1 for the multicore cable that are equal in diameter. Core electric wire 1 for the multicore cable has conductor 2 and insulating layer 3, as described above.

<Sheath Layer>

Sheath layer 5 has a two-layer structure including inner sheath layer 5a disposed on an external side of core wire 4 and outer sheath layer 5b disposed on an outer circumference of inner sheath layer 5a.

Inner sheath layer 5a is not particularly limited in what it has as its major component insofar as it is elastic synthetic resin, and examples thereof include polyolefins such as polyethylene and EVA, polyurethane elastomers, and polyester elastomers. Two or more of these may be mixed together and thus used.

Inner sheath layer 5a has a minimum thickness (i.e., a minimum distance between core wire 4 and the outer circumference of inner sheath layer 5a) with a lower limit preferably of 0.3 mm, more preferably 0.4 mm. Inner sheath layer 5a has the minimum thickness with an upper limit preferably of 0.9 mm, more preferably 0.8 mm. Inner sheath layer 5a has an outer diameter with a lower limit preferably of 6.0 mm, more preferably 7.3 mm. Inner sheath layer 5a has the outer diameter with an upper limit preferably of 10 mm, more preferably 9.3 mm.

Outer sheath layer 5b is not particularly limited in what it has as its major component insofar as it is a synthetic resin excellent in flame retardancy and abrasion resistance, and it may be polyurethane or the like for example.

Outer sheath layer 5b has an average thickness preferably of 0.3 mm or more and 0.7 mm or less.

Inner sheath layer 5a and outer sheath layer 5b each preferably have a resin component crosslinked. How inner sheath layer 5a and outer sheath layer 5b are crosslinked can be the same as how insulating layer 3 is crosslinked.

Inner sheath layer 5a and outer sheath layer 5b may contain an additive indicated above for insulating layer 3 by way of example.

A tape member such as paper may be wound between sheath layer 5 and core wire 4 as a member to restrain winding.

<Method for Manufacturing Multicore Cable>

Multicore cable 10 can be obtained in a manufacturing method comprising the steps of: stranding a plurality of core electric wires 1 together for a multicore cable (a stranding step): and coating with a sheath layer an external side of core wire 4 composed of the plurality of core electric wires 1 stranded together for the multicore cable (a step of coating with a sheath layer).

Figure 3:
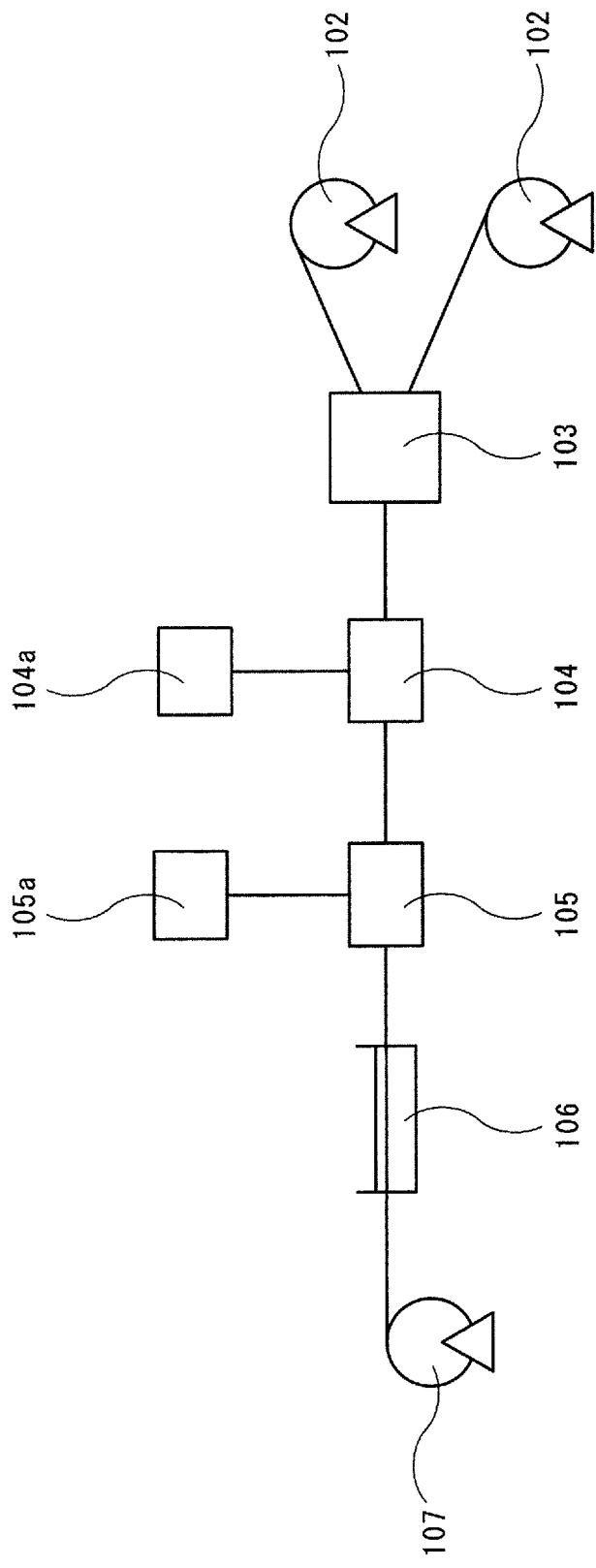
FIG. 3 is a schematic diagram showing a multicore cable manufacturing apparatus according to the present disclosure.

The above method for manufacturing the multicore cable can be performed by using a multicore cable manufacturing apparatus shown in FIG. 3. The multicore cable manufacturing apparatus mainly includes a plurality of core electric wire supplying reels 102, a stranding unit 103, a unit 104 which provides an inner sheath layer for coating, a unit 105 which provides an outer sheath layer for coating, a cooling unit 106, and a cable winding reel 107.

(Stranding Step)

In the stranding step, core electric wires 1 for a multicore cable that are wound on the plurality of core electric wire supplying reels 102 are supplied to stranding unit 103, which strands core electric wires 1 together to form core wire 4.

(Step of Coating with a Sheath Layer)

In the step of coating with a sheath layer, unit 104 that provides an inner sheath layer for coating extrudes on an external side of core wire 4 formed by stranding unit 103 a resin composition reserved in a reservoir 104a for forming the inner sheath layer. Thus core wire 4 is externally coated with inner sheath layer 5a.

After coating with inner sheath layer 5a, unit 105 that provides an outer sheath layer for coating extrudes on an outer circumference of inner sheath layer 5a a resin composition reserved in a reservoir 105a for forming the outer sheath layer. Thus, inner sheath layer 5a has the outer circumference coated with outer sheath layer 5b.

After coating with outer sheath layer 5b, core wire 4 is cooled by cooling unit 106 to set sheath layer 5, and multicore cable 10 is thus obtained. Multicore cable 10 is wound by cable winding reel 107 and thus collected.

It is recommendable that the method for manufacturing the multicore cable further comprise the step of crosslinking a resin component of sheath layer 5 (a crosslinking step). The crosslinking step may be performed before coating core wire 4 with the composition that forms sheath layer 5, or may be performed thereafter (i.e., after sheath layer 5 is formed).

The crosslinking step can be performed by exposing the composition to ionizing radiation, as has been done for insulating layer 3 of core electric wire 1 for a multicore cable. Exposure to ionizing radiation is performed at a dose with a lower limit preferably of 50 kGy, more preferably 100 kGy. Exposure to ionizing radiation is performed at the dose with an upper limit preferably of 300 kGy, more preferably 240 kGy. When the dose is smaller than the lower limit, the crosslinking reaction may insufficiently proceed. When the dose is larger than the upper limit, the resin component may be decomposed.

Third Embodiment

Figure 4:
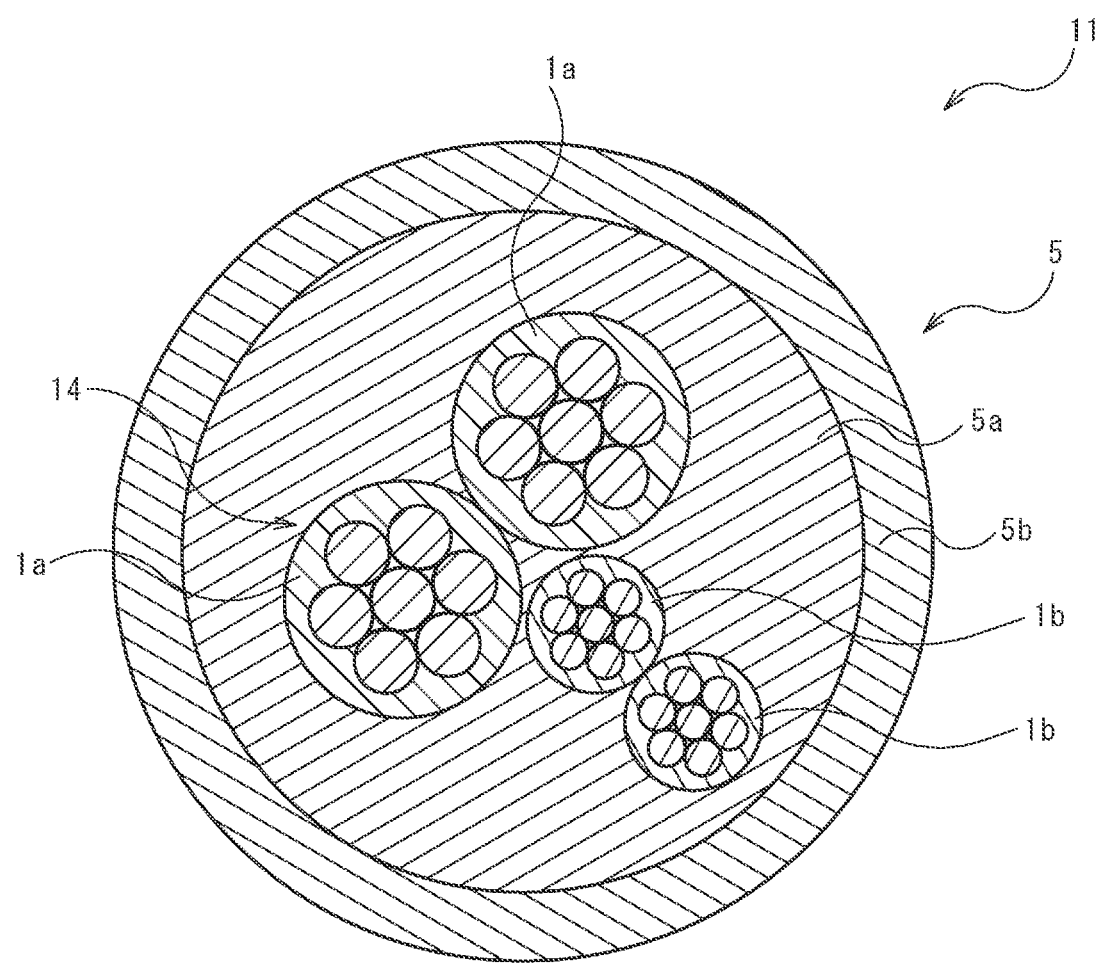
FIG. 4 is a schematic cross section of a multicore cable according to a third embodiment of the present disclosure.

FIG. 4 shows a multicore cable 11 comprising a core wire 14 composed of a plurality of core electric wires, each as shown in FIG. 1, stranded together for the multicore cable, and sheath layer 5 disposed to surround core wire 14. In contrast to multicore cable 10 of FIG. 2, multicore cable 11 comprises core wire 14 composed of a plurality of core electric wires having different diameters and stranded together for the multicore cable. Multicore cable 11 can suitably be used as a signal cable for an electric parking brake (EPB), and in addition, for transmitting an electrical signal to control an operation of an anti-lock brake system (ABS). Sheath layer 5 is the same as sheath layer 5 of multicore cable 10 of FIG. 2, and accordingly, identically denoted and will not be described.

<Core Wire>

Core wire 14 is configured by stranding together two first core electric wires 1*a* equal in diameter and two second core electric wires 1*b* smaller in diameter than first core electric wires 1*a* and equal in diameter. Specifically, core wire 14 is configured by stranding together the two first core electric wires 1*a* and a single stranded core electric wire composed of a twisted pair of the two second core electric wires 1*b*. When multicore cable 11 is used as a parking brake and an ABS signal cable, the single stranded core electric wire composed of second core electric wires 1*b* stranded together transmits a signal for the ABS.

First core electric wire 1*a* is identical to the FIG. 1 core electric wire 1 for a multicore cable. Second core electric wire 1*b* is similar in configuration to first core electric wire 1*a* except for a dimension in lateral cross section, and can also be identical in material thereto.

Other Embodiments

It should be understood that the embodiments disclosed herein have been described for the purpose of illustration only and in a non-restrictive manner in any respect. The scope of the present disclosure is defined by the terms of the claims, rather than the configurations of the above embodiments, and is intended to include any modifications within the meaning and scope equivalent to the terms of the claims.

The multicore cable may have the sheath layer in the form of a single layer or a multilayer structure of two or more layers.

The multicore cable may comprise as a core electric wire an electric wire other than the presently disclosed core electric wire for a multicore cable. It should be noted, however, that in order to effectively exhibit an effect of the present disclosure, it is preferable that any core electric wire be the presently disclosed core electric wire for a multicore cable. The core electric wire for a multicore cable is not particularly limited in number insofar as two or more core electric wires are used, and four core electric wires, six core electric wires, etc. can also be used.

Furthermore, the core electric wire for a multicore cable may have a primer layer directly disposed on the conductor. As the primer layer, what is obtained by crosslinking a crosslinkable resin such as polyethylene containing no metal hydroxide can suitably be used. Such a primer layer can prevent deterioration of the insulating layer and the conductor in peelability with time.

EXAMPLES

Hereinafter, the present disclosure will be described in more detail with reference to examples, although the present disclosure is not limited to thereto.

[Preparing Core Electric Wire]

A composition for forming an insulating layer was prepared in accordance with a formulation shown in Table 1, and extruded on a circumference of a conductor (average diameter: 2.4 mm) composed of 7 strands each formed of 72 elemental wires of soft copper (copper) having an average diameter of 80 μm and twisted together, to form the insulating layer having an outer diameter of 3 mm, thereby obtaining first core electric wires of Nos. 1 to 13. The insulating layer was exposed to an electron beam at 120 kGy to crosslink a resin component.

In Table 1, "HDPE" is "NOVATEC® HB432E" of Japan Polyethylene Corporation (density: 0.957). "EEA" is "Rexpearl® A1100" of Japan Polyethylene Corporation (ethyl acrylate content: 10% by mass, density: 0.94), "EVA" is "EVAFLEX® EV460" of DuPont-Mitsui Polychemicals Co., Ltd. (vinyl acetate content: 19% by mass, density: 0.94), "VLDPE" is "TAFMER® DF710" of Mitsui Chemicals, Inc. (density: 0.87), "LLDPE" is "NOVATEC® UF230" of Japan Polyethylene Corporation (density: 0.921), and "LDPE" is "NOVATEC® LF280H" of Japan Polyethylene Corporation (density: 0.928).

Further, in Table 1, "flame retardant" is aluminum hydroxide ("Hygilite® H-31" of SHOWA DENKO K.K.), "flame retardant 2" is a bromine-based flame retardant ("SAYTEX® 8010" of Albemarle Corporation), "flame retardant 3" is antimony trioxide, and "antioxidant" is "IRGANOX® 1010" of BASF.

In Table 1, "-" indicates that no component corresponding thereto was used.

[Producing Multicore Cable]

On a circumference of a conductor (average diameter: 0.72 mm) composed of 60 elemental copper alloy wires having an average diameter of 80 μm and twisted together, crosslinked flame retardant polyolefin was extruded to form an insulating layer having an outer circumference of 1.4 mm to form a core electric wire, and such core electric wires are stranded together to obtain a second core electric wire.

Subsequently, two first core electric wires, cacti as described above, identical in type, and the above second core electric wire were stranded together to form a core wire, which was in turn circumferentially coated with a sheath layer through extrusion to produce multicore cables of Nos. 1 to 13. As the sheath layer were formed an inner sheath layer containing crosslinked polyolefin as a major component and having a minimum thickness of 0.45 mm and an average outer diameter of 7.4 mm and an outer sheath layer containing flame retardant crosslinked polyurethane as a major component and having an average thickness of 0.5 mm and an average outer diameter of 8.4 mm. The sheath layer had a resin component crosslinked by electron beam radiation at 180 kGy.

[Coefficient of Linear Expansion and Modulus of Elasticity]

The first core electric wires of Nos. 1 to 13 had their insulating layers subjected to calculation of coefficient of linear expansion C for −35° C. to 25° C. from a dimensional change of a thin plate with respect to variation in temperature pursuant to a method for determining dynamic mechanical properties, as specified in JIS-K7244-4 (1999), using a dynamic viscoelasticity analyzer ("DVA-220" manufactured by IT keisoku seigyo K.K.), in a tensile mode in a range in temperature of −100° C. to 200° C. with a temperature increasing rate of 5° C./minute at a frequency of 10 Hz with a strain of 0.05%. Further, the first core electric wires had their insulating layers subjected to calculation of modulus of elasticity $E_1$ for −35° C. and modulus of elasticity $E_2$ for 25° C. from a storage modulus measured pursuant to the method for determining dynamic mechanical properties, as specified in JIS-K7244-4 (1999), using the above dynamic viscoelasticity analyzer, in a tensile mode in a range in temperature of −100° C. to 200° C. with a temperature increasing rate of 5° C./minute at a frequency of 10 Hz with a strain of 0.05%. A result thereof is shown in Table 1.

[Abrasion Test]

The first core electric wires of Nos. 1 to 13 had their insulating layers determined, as follows: pursuant to a scrape abrasion test as specified in ISO 6722-1 (2011), and using a scrape abrasion tester ("5420-7N" manufactured by TAVB), how many time a needle having a diameter of 0.45 mm was reciprocated at a testing rate of 55 times/minute along a length of 15 mm at room temperature with a testing load of 7N before the needle abrades through a sample for assessment of A (750 times or more) and B (less than 750 times). A result thereof is shown in Table 1.

[Bending Test]

Figure 5:
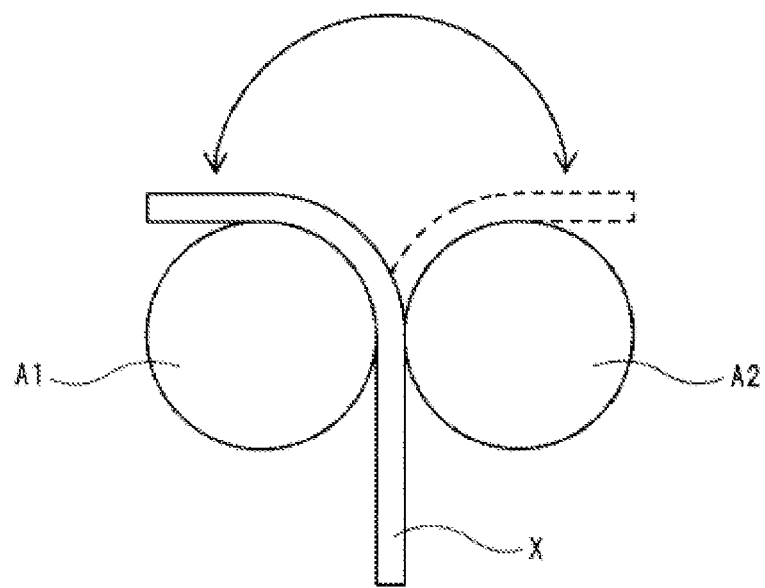
FIG. 5 is a schematic diagram for illustrating a bending test in an example.

As shown in FIG. 5, a multicore cable X of each of No. 1 to No. 13 was passed vertically between two mandrels A1 and A2 having a diameter of 60 mm and disposed horizontally and parallel to each other, and had an upper end cyclically bent first by 90° in the horizontal direction so as to abut against an upper side of one mandrel A1 and thereafter by 90° in the opposite direction so as to abut against an upper side of the other mandrel A2 The test was conducted under the following conditions: multicore cable X, with a load of 2 kg applied to its lower end downward, was bent at a temperature of −35° C. at a bending cycle of 60/minute for a total of 50000 times. After the test, each core electric wire's state was confirmed for A (no abnormality: conductible) or B (breakage: no longer conductible). A result thereof is shown in Table 1.

TABLE 1

| | | | No. 1 | No. 2 | No. 3 | No. 4 | No. 5 | No. 6 | No. 7 |
|---|---|---|---|---|---|---|---|---|---|
| insulating layer | polyethylene-based resin content (parts by mass) | HDPE | 70 | 60 | 20 | 10 | 60 | 10 | 40 |
| | | EEA | 30 | 40 | 80 | 90 | 20 | 80 | 20 |
| | | EVA | — | — | — | — | — | — | — |
| | | VLDPE | — | — | — | — | — | — | — |
| | | LLDPE | — | — | — | — | 20 | 10 | 40 |
| | | LDPE | — | — | — | — | — | — | — |
| | additive content (parts by mass) | flame retardant 1 | 70 | 70 | 70 | 70 | 70 | 70 | 70 |
| | | flame retardant 2 | — | — | — | — | — | — | — |
| | | flame retardant 3 | — | — | — | — | — | — | — |
| | | antioxidant | 1 | 1 | 1 | 1 | 1 | 1 | 1 |
| | coefficient of linear expansion C (K$^{-1}$) (−35° C. to 25° C.) | | $2.50 \times 10^{-4}$ | $2.00 \times 10^{-4}$ | $6.00 \times 10^{-5}$ | $4.00 \times 10^{-5}$ | $2.00 \times 10^{-4}$ | $5.00 \times 10^{-4}$ | $1.40 \times 10^{-4}$ |
| | modulus of elasticity $E_1$ (MPa) (−35° C.) | | 4000 | 3500 | 2700 | 2500 | 3500 | 2600 | 3100 |
| | modulus of elasticity $E_2$ (MPa) (25° C.) | | 1800 | 1500 | 450 | 220 | 1600 | 250 | 1000 |
| | C × $E_1$ | | 1.00 | 0.70 | 0.16 | 0.10 | 0.70 | 0.13 | 0.43 |
| multicore cable | abrasion resistance | | A | A | A | B | A | A | A |
| | bending durability | | B | A | A | A | A | A | A |

| | | | No. 8 | No. 9 | No. 10 | No. 11 | No. 12 | No. 13 |
|---|---|---|---|---|---|---|---|---|
| insulating layer | polyethylene-based resin content (parts by mass) | HDPE | 25 | 15 | 25 | 60 | 60 | 65 |
| | | EEA | 50 | 70 | 50 | — | 20 | — |
| | | EVA | — | — | — | — | — | 35 |
| | | VLDPE | — | — | — | 40 | — | — |
| | | LLDPE | 25 | 15 | 25 | — | — | — |
| | | LDPE | — | — | — | — | 20 | — |
| | additive content (parts by mass) | flame retardant 1 | 70 | 70 | 30 | 70 | 70 | 70 |
| | | flame retardant 2 | — | — | 10 | — | — | — |
| | | flame retardant 3 | — | — | 10 | — | — | — |
| | | antioxidant | 1 | 1 | 1 | 1 | 1 | 1 |
| | coefficient of linear expansion C (K$^{-1}$) (−35° C. to 25° C.) | | $1.20 \times 10^{-4}$ | $9.00 \times 10^{-5}$ | $1.20 \times 10^{-4}$ | $1.80 \times 10^{-4}$ | $2.00 \times 10^{-4}$ | $2.00 \times 10^{-4}$ |
| | modulus of elasticity $E_1$ (MPa) (−35° C.) | | 3400 | 2500 | 3300 | 3200 | 3500 | 5000 |

TABLE 1-continued

| | | | | | | | |
|---|---|---|---|---|---|---|---|
| modulus of elasticity $E_2$ (MPa) (25° C.) | | 750 | 350 | 700 | 1300 | 1600 | 1500 |
| | C × $E_1$ | 0.41 | 0.23 | 0.40 | 0.58 | 0.70 | 1.00 |
| multicore cable | abrasion resistance | A | A | A | A | A | A |
| | bending durability | A | A | A | A | A | B |

As shown in Table 1, the multicore cables of Nos. 2, 3, and 5 to 12, which comprised an insulating layer containing a polyethylene-based resin as a major component, the polyethylene-based resin including a first component (high density polyethylene) and a second component (at least one selected from the group consisting of a copolymer of ethylene and an α-olefin having a carbonyl group and very-low density polyethylene), the first component having a content ratio of 10% by mass or more and 60% by mass or less to a total content of the polyethylene-based resin, the second component having a content ratio of 20% by mass or more and 80% by mass or less to the total content of the polyethylene-based resin, provided good results in the abrasion test and the bending test. The above result has revealed that the presently disclosed examples are excellent in abrasion resistance, and bending durability for low temperature.

REFERENCE SIGNS LIST 1a, 1b core wire for multicore cable, 2 conductor, 3 insulating layer. 4, 14 core wire, 5 sheath layer, 5a inner sheath layer, 5b outer sheath layer, 10, 11 multicore cable, 102 core electric wire supplying reel, 103 stranding unit, 104 unit providing inner sheath layer for coating, 104a, 105a reservoir, 105 unit providing outer sheath layer for coating, 106 cooling unit, 107 cable winding reel, A1, A2 mandrel, X multicore cable.

The invention claimed is:

1. A core electric wire for a multicore cable that comprises a conductor composed of a plurality of elemental wires twisted together and an insulating layer coating a circumference of the conductor,
the insulating layer including a polyethylene-based resin including a first component and a second component,
the first component being high density polyethylene,
the second component being at least one selected from the group consisting of a copolymer of ethylene and an α-olefin having a carbonyl group, and very-low density polyethylene,
the first component having a content ratio of 10% by mass or more and 60% by mass or less to a total content of the polyethylene-based resin,
the second component having a content ratio of 30% by mass or more and 80% by mass or less to the total content of the polyethylene-based resin.

2. The core electric wire for a multicore cable according to claim 1, wherein the copolymer of the ethylene and the α-olefin having the carbonyl group is an ethylene-acrylic acid alkyl ester copolymer.

3. The core electric wire for a multicore cable according to claim 1, wherein
the polyethylene-based resin further includes a third component, and
the third component is at least one selected from the group consisting of linear low density polyethylene and low density polyethylene.

4. The core electric wire for a multicore cable according to claim 3, wherein the third component has a content ratio of 5% by mass or more and 45% by mass or less to the total content of the polyethylene-based resin.

5. The core electric wire for a multicore cable according to claim 1, wherein the insulating layer further includes a flame retardant.

6. The core electric wire for a multicore cable according to claim 1, wherein the conductor has an average lateral cross-sectional area of 1.0 mm² or more and 3.0 mm² or less.

7. The core electric wire for a multicore cable according to claim 1, wherein the elemental wire has an average diameter of 40 μm or more and 100 μm or less, and the plurality of elemental wires are 196 to 2450 elemental wires.

8. The core electric wire for a multicore cable according to claim 1, wherein the conductor is a stranded wire composed of strands each composed of a plurality of elemental wires twisted together.

9. A multicore cable comprising a core wire composed of a plurality of core electric wires stranded together and a sheath layer surrounding the core wire, at least one of the plurality of core electric wires being a core electric wire for a multicore cable according to claim 1.

10. The multicore cable according to claim 9, being an in-vehicle cable.

* * * * *